No. 747,339. PATENTED DEC. 15, 1903.
W. WRIGHT, DEC'D.
M. E. WRIGHT, ADMINISTRATRIX.
VALVE.
APPLICATION FILED MAR. 19, 1903.
NO MODEL.
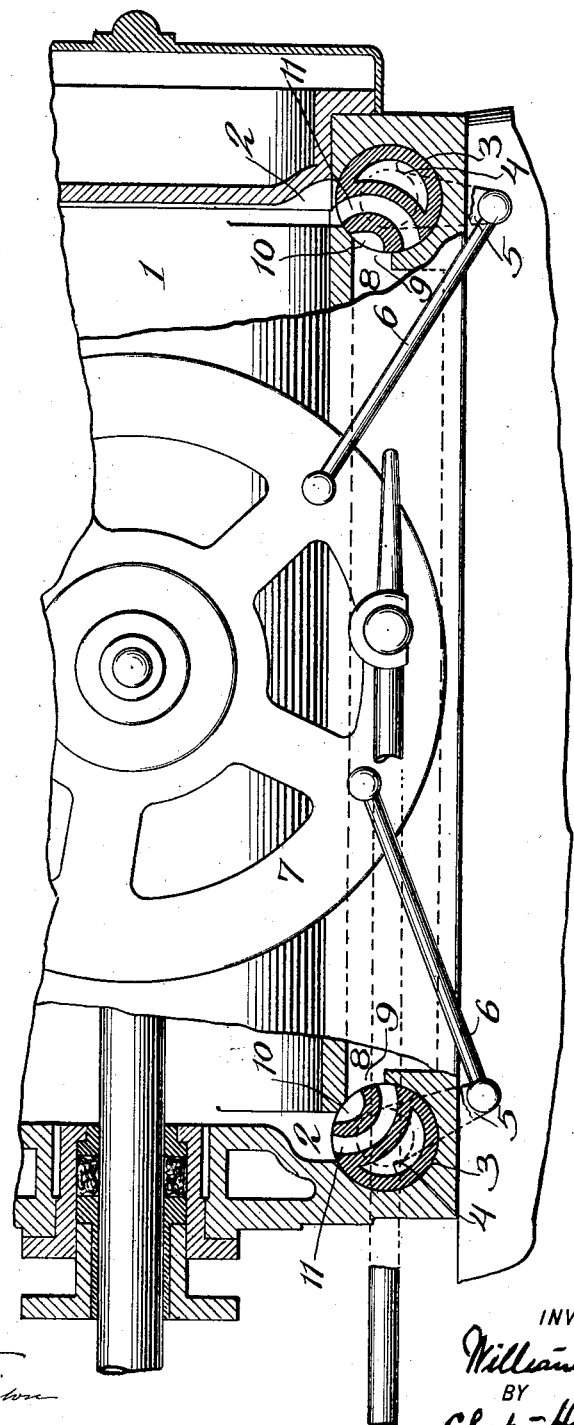
WITNESSES:
INVENTOR
William Wright
BY
Chapin Haywood & Marble
ATTORNEYS No. 747,339. Patented December 15, 1903.

UNITED STATES PATENT OFFICE.

WILLIAM WRIGHT, OF NEW YORK, N. Y.; MARY E. WRIGHT ADMINISTRATRIX OF SAID WILLIAM WRIGHT, DECEASED.

VALVE.

SPECIFICATION forming part of Letters Patent No. 747,339, dated December 15, 1903.

Application filed March 19, 1903. Serial No. 148,472. (No model.)

*To all whom it may concern:*

Be it known that I, WILLIAM WRIGHT, a citizen of the United States, residing at New York, in the borough of Brooklyn, county of Kings, and State of New York, have invented certain new and useful Improvements in Valves; and I do hereby declare the following to be a full, clear, and exact description of the invention, such as will enable others skilled in the art to which it appertains to make and use the same.

My invention relates to improvements in valves for steam and other engines, air-compressors, and the like; and it consists in a novel arrangement of ports and passages.

The objects of my invention are to avoid wire-drawing and the like at the time of opening and closing of the valve, to provide large port-opening, to reduce friction of fluid flowing through the valve to a minimum, and to make the valve simple and easy of construction.

I will now proceed to describe my invention with reference to the accompanying drawing, which shows a side view and partial longitudinal section of a portion of the cylinder of a steam-engine of the Corliss type, the exhaust-valves thereof constructed in accordance with my invention being sectioned transversely, and will then point out the novel features in the claim.

The said drawing shows an engine-cylinder 1, having at its ends exhaust-ports 2, communicating with exhaust-valve chambers 3, within which are the exhaust-valves 4. Said valves are rotary valves substantially cylindrical in form and may be oscillated back and forth by arms 5 and rods 6, connected to a wrist-plate 7, which is arranged to be vibrated in the usual manner. Between the valve-chambers 3 there is an exhaust-space 8, with which said valve-chambers connect by means of ports 9. In the side of each valve there is a recess 10, forming a port or passage, which in certain positions of the valve connects the corresponding cylinder exhaust-port 2 with the corresponding port 9. Besides the recess or port 10 each valve has a second port or passage 11 substantially parallel to the direction of flow of fluid through recess 10 and arranged likewise to connect ports 2 and 9 when the recess-port 10 is connecting the same. In the operation of the valves port 11 is opened and closed simultaneously with port 10, giving relatively large port-opening at the time of opening and closing of the valves.

The recess 10 of each valve provides the most direct passage possible for connecting ports 2 and 9. Since the passage 11 is parallel to the direction of flow of fluid through recess 10, the fluid will flow through said passage 11 with a minimum of friction.

The improved valve herein described is not confined to use as an exhaust-valve, but may also be used as an admission-valve, and the valve may be used in other types of motors besides reciprocating steam-engines and may be used in connection with the air-cylinders of air-compressors, blowing-engines, and the like.

In stating above that the valve is substantially cylindrical I do not wish to be understood that the valve may not have the slight taper with which such valves are customarily provided to permit the taking up of wear.

I do not limit myself to the precise arrangement and form of valve-ports shown in the drawing or to the precise location and relative arrangement of ports in the valve-chamber.

What I claim is—

The combination with an engine-cylinder or the like, and a valve-chamber having a single port communicating with said cylinder, and another port through which fluid may pass into or out of said valve-chamber, of a rotary valve within said chamber, having two parallel ports, both of which, in the open position of the valve, connect directly the said ports of the valve-chamber, permitting direct passage of fluid through said valve-chamber from one port thereof to the other, one of said ports arranged to be closed, in the closed position of the valve, by a portion of the valve-chamber adjacent to the cylinder-port, the other port of the valve arranged to be closed, in such closed position of the valve, by a portion of the valve-chamber adjacent to the other port thereof.

In testimony whereof I affix my signature in the presence of two witnesses.

WM. WRIGHT.

Witnesses:
 HARRY M. MARBLE,
 MARY E. WRIGHT.